US012739280B2

(12) United States Patent
Chukkapalli et al.

(10) Patent No.: US 12,739,280 B2
(45) Date of Patent: Sep. 15, 2026

(54) ACCELERATED POLICY ASSESSMENT FOR REQUESTS

(71) Applicant: International Business Machines Corporation, Armonk, NY (US)

(72) Inventors: Sai Sree Laya Chukkapalli, Catonsville, MD (US); Julian James Stephen, Yorktown Heights, NY (US); Arjun Natarajan, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 18/655,070

(22) Filed: May 3, 2024

(65) Prior Publication Data

US 2025/0343821 A1 Nov. 6, 2025

(51) Int. Cl.
*H04L 29/00* (2006.01)
*H04L 9/40* (2022.01)

(52) U.S. Cl.
CPC .......... *H04L 63/20* (2013.01); *H04L 63/1425* (2013.01)

(58) Field of Classification Search
CPC ............................ H04L 63/20; H04L 63/1425
See application file for complete search history.

(56) References Cited

U.S. PATENT DOCUMENTS 10,230,571 B2 3/2019 Rangasamy et al.
10,242,073 B2 3/2019 Koerner et al.
10,389,602 B2 8/2019 Chang et al.
10,411,973 B2 9/2019 Brown et al.
10,425,386 B2 9/2019 Wardell et al.
10,769,274 B2 9/2020 Hassan
11,057,393 B2 7/2021 Coffing
(Continued)

FOREIGN PATENT DOCUMENTS

CN 109309666 A 2/2019
CN 110971575 A 4/2020

OTHER PUBLICATIONS

International Searching Authority, "Notification of Transmittal of the International Search Report and the Written Opinion of the International Searching Authority, or Declaration," Patent Cooperation Treaty Jun. 4, 2025, 09 pages, International Application No.—PCT/ IB2025/052676.
(Continued)

*Primary Examiner* — Jeffrey C Pwu
*Assistant Examiner* — Helai Salehi
(74) *Attorney, Agent, or Firm* — Monchai Chuaychoo

(57) ABSTRACT

A computer-implemented method, according to one approach, is performed in response to intercepting an application request. The computer-implemented method includes forwarding a first copy of the application request to a policy agent, and forwarding a second copy of the application request to a sketch algorithm. The sketch algorithm extracts metadata from the second copy of the application request. Moreover, the policy agent applies a security policy to the first copy of the application request and the metadata extracted by the sketch algorithm. Furthermore, the application request is dispositioned based at least in part on whether the first copy of the application request and/or the metadata extracted by the sketch algorithm satisfy the security policy.

14 Claims, 13 Drawing Sheets

(56) References Cited

U.S. PATENT DOCUMENTS

| | | | |
|---|---|---|---|
| 11,233,826 B2 | 1/2022 | Nakagoe et al. | |
| 11,271,969 B2 | 3/2022 | Pitre et al. | |
| 11,411,974 B2 | 8/2022 | Vittal | |
| 11,824,836 B2 | 11/2023 | Jiang et al. | |
| 11,943,260 B2 | 3/2024 | Narayanaswamy et al. | |
| 2021/0036991 A1* | 2/2021 | Owens | H04L 63/126 |
| 2021/0067543 A1* | 3/2021 | Levy Nahum | H04L 63/1441 |
| 2023/0146667 A1 | 5/2023 | Jiang et al. | |
| 2023/0208817 A1 | 6/2023 | Veereshwara et al. | |

OTHER PUBLICATIONS

Minna et al., "SoK: Run-time security for cloud microservices. Are we there yet?" Computers & Security, vol. 127, 2023, pp. 1-14.

Li et al., "Automatic Policy Generation for Inter-Service Access Control of Microservices," 30th USENIX Security Symposium, Aug. 2021, pp. 3971-3988.

Li et al. "MicroSketch: Lightweight and Adaptive Sketch Based Performance Issue Detection and Localization in Microservice Systems," International Conference on Service-Oriented Computing (ICSOC), 2022, pp. 219-236.

Zaheer et al., "eZTrust: Network-Independent Zero-Trust Perimeterization for Microservices," Proceedings of the ACM Symposium on SDN Research, 2019, 13 pages.

Li et al., "Towards Automated Inter-Service Authorization for Microservice Applications," Proceedings of the ACM SIGCOMM Posters and Demos, 2019, 4 pages.

Chakraborty et al., "CausIL: Causal Graph for Instance Level Microservice Data," WWW23, Apr./May 2023, pp. 2905-2915.

Jacob et al., "Detecting Cyber Security Attacks against a Microservices Application using Distributed Tracing," Proceedings of the 7th International Conference on Information Systems Security and Privacy (ICISSP), 2021, pp. 588-595.

Meadows et al., "Sidecar-based Path-aware Security for Microservices," Proceedings of the 28th ACM Symposium on Access Control Models and Technologies, 2023, pp. 157-162.

Parker et al., "Visualizing Anti-Patterns in Microservices at Runtime: A Systematic Mapping Study," IEEE Access, vol. 11, Jan. 2023, pp. 4434-4442.

Yang et al., "Elastic Sketch: Adaptive and Fast Network-wide Measurements," SIGGCOMM, Aug. 2018, 15 pages, retrieved from https://conferences.sigcomm.org/events/apnet2018/papers/elastic_sketch.pdf.

Cormode et al., "An Improved Data Stream Summary: The Count-Min Sketch and its Applications," Journal of Algorithms, vol. 55, 2005, 11 pages, retrieved from https://github.com/florian/reading-notes/blob/master/papers/015_An_Improved_Data_Stream_Summary_The_Count-Min_Sketch_and_its_Applications.md.

Jiang et al., U.S. Appl. No. 17/453,887, filed Nov. 8, 2021.

* cited by examiner

430

ACCELERATED POLICY ASSESSMENT FOR REQUESTS

BACKGROUND

The present invention relates to processing received requests, and more specifically, this invention relates to evaluating the legitimacy of requests.

Data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices.

This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in some conventional systems in an effort to improve the ability to process this increasing amount of data, moving sensitive workloads to the cloud requires a secure cloud infrastructure. For example, the process of moving certain workloads to cloud for computation efficiency assumes (e.g., requires) the cloud to be secure. While conventional container orchestration platforms have provided some security measures for cloud workloads, they are fragmented and inefficient at protecting against advanced threats. These conventional platforms are also unable to scale properly, thereby limiting application of a platform to a select set of circumstances.

SUMMARY

A computer-implemented method (CIM), according to one approach, is performed in response to intercepting an application request. The CIM includes forwarding a first copy of the application request to a policy agent, and forwarding a second copy of the application request to a sketch algorithm. The sketch algorithm extracts metadata from the second copy of the application request. Moreover, the policy agent applies a security policy to the first copy of the application request and the metadata extracted by the sketch algorithm. Furthermore, the application request is dispositioned based at least in part on whether the first copy of the application request and/or the metadata extracted by the sketch algorithm satisfy the security policy.

A computer program product (CPP), according to another approach, includes: a set of one or more computer-readable storage media. The CS also includes program instructions that are collectively stored in the set of one or more storage media, and are for causing a processor set to perform any combination(s) of the foregoing methodologies.

A computer system (CS), according to yet another approach, includes: a processor set, and a set of one or more computer-readable storage media. The CS also includes program instructions that are collectively stored in the set of one or more storage media, and are for causing the processor set to perform any combination(s) of the foregoing methodologies.

Other aspects and implementations of the present invention will become apparent from the following detailed description, which, when taken in conjunction with the drawings, illustrate by way of example the principles of the invention.

DETAILED DESCRIPTION

Figure 1:
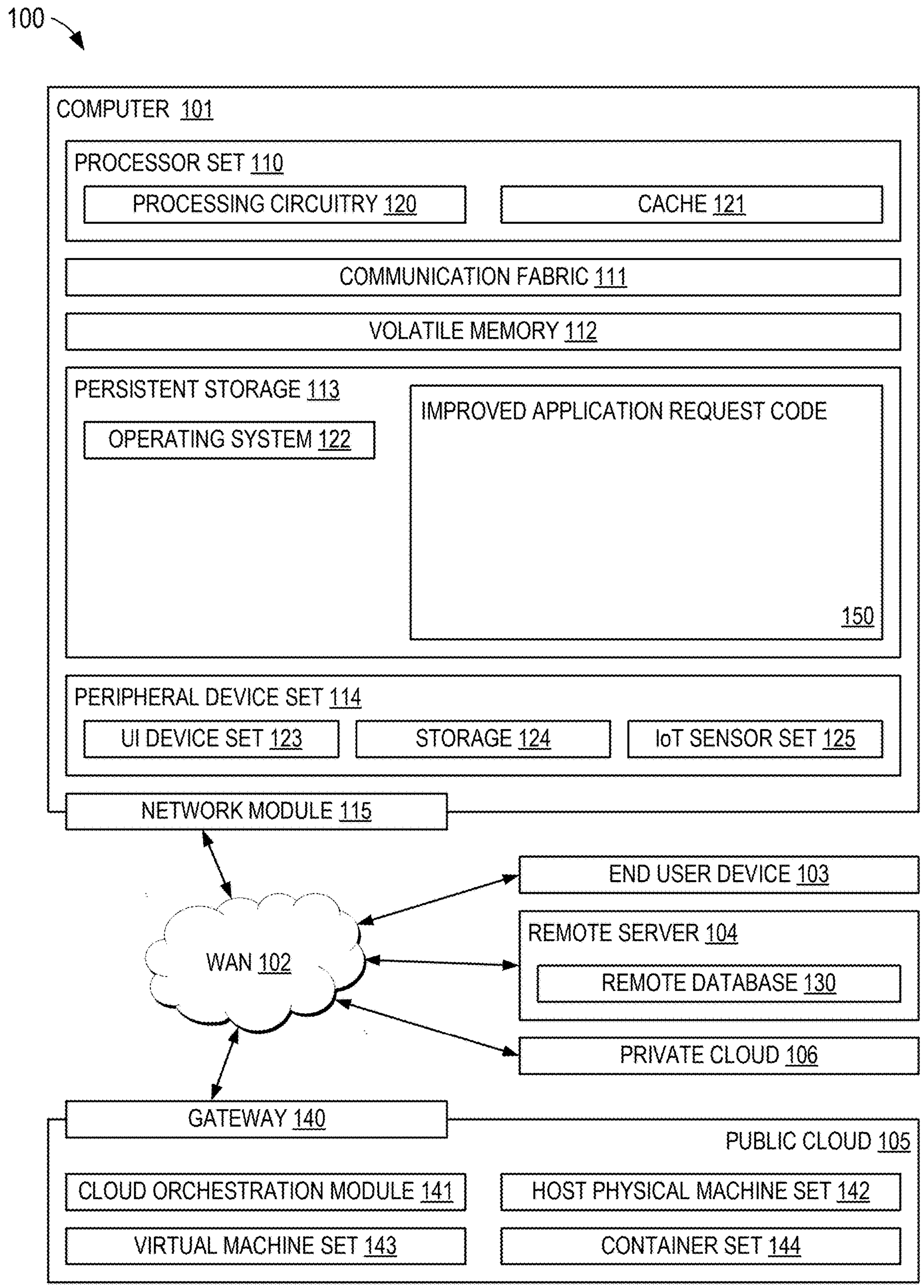
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for achieving sketch based network traffic summarization in real-time. This is accomplished by developing and maintaining security policy enforcement that utilizes metadata, particularly Level 7 metadata, and probabilistic data structures. Approaches herein are thereby able to significantly accelerate security policy assessments by collecting and evaluating metadata in real-time, which is particularly desirable for cloud microservices, e.g., as will be described in further detail below.

In one general approach, a CIM is performed in response to intercepting an application request. The CIM includes forwarding a first copy of the application request to a policy agent, and forwarding a second copy of the application request to a sketch algorithm. The sketch algorithm extracts metadata from the second copy of the application request. Moreover, the policy agent applies a security policy to the first copy of the application request and the metadata extracted by the sketch algorithm. Furthermore, the application request is dispositioned based at least in part on whether the first copy of the application request and/or the metadata extracted by the sketch algorithm satisfy the security policy.

It follows that approaches herein are able to implement policy (e.g., security policy) enforcement in real-time with minimal overhead to memory. For instance, by auditing requests that are sent between applications (e.g., services), sketch algorithms herein are able to extract audit logs to summarize while simultaneously consuming less memory. Approaches herein are thereby able to prevent a variety of attacks, including Hypertext Transfer Protocol (HTTP) GET DOS, misusing leaked auth tokens, etc. Furthermore, approaches are able to reduce memory footprint by over 50% in comparison to conventional products, while achieving a negligible loss in accuracy, e.g., as will be described in further detail below.

In some implementations, the first and second copies of the application request are forwarded to the policy agent and the sketch algorithm simultaneously. Moreover, the application request may be intercepted by a proxy. Forwarding the first and second copies of the application request to the policy agent and the sketch algorithm simultaneously allows for the copies to be evaluated at the same time. For instance, the policy agent and the sketch algorithm are able to begin evaluating the respective copies of the application request in parallel, thereby decreasing latency.

In some implementations, the sketch algorithm extracts metadata from the second copy of the application request by accessing Layer 7 metadata in the second copy of the application request. Moreover, a width is applied while summarizing the Layer 7 metadata streaming traffic. The Layer 7 metadata may be selected from the group consisting of: service names, authentication tokens, Uniform Resource Locator (URL) paths, session tokens, cookies, and HTTP response codes.

As a result, implementations herein to develop and maintain security policy enforcement by utilizing metadata, particularly Level 7 metadata, and probabilistic data structures to analyze incoming application requests. Accelerated security policy assessments may thereby be achieved by collecting and evaluating metadata in real-time, which is particularly desirable for cloud microservices. This is in stark contrast to the disadvantages that conventional products have suffered from, the most notable being consistently overcounting occurrences. These conventional products are limited to using algorithms that cannot be relied on for an accurate count of network events and other events. For instance, hash collisions contribute to these conventional algorithms being unable to maintain accurate counts. As a result, conventional products have been unable to perform efficiently and maintain an accurate understanding of current operating conditions.

In some implementations, the width is determined while training the sketch algorithm, by: forwarding all network traffic to the sketch algorithm. Accordingly, the sketch algorithm observes the network traffic for a predetermined amount of time. A width that most effectively summarizes the network traffic is thereby identified. In some implementations, the width is also dynamically updated over time. The width is updated by observing active network traffic for a predetermined amount of time. In response to detecting diverse active network traffic, the width is increased. However, in response to detecting lean active network traffic, the width is decreased.

It should be noted that the "width" of a sketch algorithm intends to refer to the amount of memory that is allocated to the algorithm. Thus, sketch algorithms implementing greater widths have more memory allocated, while sketch algorithms implementing leaner (e.g., narrower) widths have less memory. Adjusting the amount of memory allocated to an algorithm in this manner desirably conserves memory. Moreover, the width may be adjusted over time as performance changes. For instance, performance experienced during a training phase of the sketch algorithm may be used to determine an initial width value. However, approaches herein have identified that the diversity of network traffic experienced actually impacts the preferred (e.g., ideal) width that is implemented by a sketch algorithm. Thus, as performance changes over time, the width is also preferably updated accordingly.

In some implementations, the width is determined while training the sketch algorithm, by: causing the policy agent to forward network traffic to the sketch algorithm. In response to detecting diverse active network traffic, the sketch algorithm dynamically increases the width. However, in response to detecting lean active network traffic, the sketch algorithm dynamically decreases the width.

Again, adjusting the amount of memory allocated to an algorithm in this manner desirably conserves memory. The diversity of network traffic experienced actually impacts the preferred (e.g., ideal) width that is implemented by a sketch algorithm. Thus, as performance changes over time, the width is also preferably updated accordingly. This allows implementations herein to efficiently apply the available memory resources, ensuring operation is maintained despite shifting operating conditions.

In some implementations, dispositioning the application request, includes: causing the application request to be forwarded to a target application for implementation in response to determining the first copy of the application request and/or the metadata extracted by the sketch algorithm satisfy the security policy. However, the application request is rejected in response to determining the first copy of the application request and/or the metadata extracted by the sketch algorithm do not satisfy the security policy. By auditing requests that are sent between applications (e.g., services) and comparing them against one or more policies (e.g., security policies), sketch algorithms herein are able to extract audit logs to summarize while simultaneously consuming less memory. Furthermore, implementations are resource efficient by dynamically adjusting a tunable sketch algorithm to achieve low memory usage in parallel with quicker policy evaluation. Implementations herein are thereby able to prevent a variety of attacks, including HTTP GET DoS, misusing leaked auth tokens, etc. Furthermore, approaches are able to reduce memory footprint by over 50% in comparison to conventional products, while achieving a negligible loss in accuracy, e.g., as will be described in further detail below.

In another general approach, a CPP includes: a set of one or more computer-readable storage media. The CS also includes program instructions that are collectively stored in the set of one or more storage media, and are for causing a processor set to perform any combination(s) of the foregoing methodologies.

In yet another general approach, a CS includes: a processor set, and a set of one or more computer-readable storage media. The CS also includes program instructions that are collectively stored in the set of one or more storage media, and are for causing the processor set to perform any combination(s) of the foregoing methodologies.

In some implementations, an application request is intercepted by a proxy from network traffic. The network traffic is received at a central server from one or more connected components (e.g., edge nodes) and/or running applications. For instance, the proxy monitors network traffic and identifies certain requests (e.g., instructions, commands, queries, etc.) of interest to evaluate for authenticity. In response to receiving (e.g., extracting) an application request of interest at the proxy, two copies of the service request are made. A first copy of the service request is forwarded to a policy agent, while the second copy of the service request is forwarded to a sketch that is preferably configured to extract metadata from the received copy of the application request. For instance, the sketch may be configured to extract Layer 7 metadata from the received copy of the application request, e.g., such as service names, authentication tokens, URL paths, session tokens, cookies, HTTP response codes, etc., or any other metadata that may assist in gaining an accurate understanding of the received service request. Metadata that is extracted by the sketch may further be stored utilizing probabilistic data structures. Metadata extracted by the sketch is forwarded along to the policy agent, which may use the metadata while determining whether the first copy of the application request satisfies one or more security policies. The policy agent has access to a policy library in which the one or more security policies and/or other access control policies may be stored and implemented, e.g., depending on the service requests that are received. In response to comparing the extracted metadata and copy of the application request to the one or more security policies, the policy agent returns a policy response to the proxy, which effectively allows or denies the application requestion from reaching the intended service target. The proxy may thereby implement the policy response. Application requests determined as satisfying the security policies may be forwarded to the service, and any responses (e.g., data, metadata, replies, returned requests, instructions, etc.) produced by the service as a part of satisfying or at least evaluating the received application request, may be returned to proxy, e.g., for storage, to resubmit in the network traffic, etc.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved application request code at block 150 for achieving sketch based network traffic summarization in real-time. This is accomplished by developing and maintaining security policy enforcement that utilizes metadata, particularly Level 7 metadata, and probabilistic data structures. Approaches herein are thereby able to significantly accelerate security policy assessments by collecting and evaluating metadata in real-time, which is particularly desirable for cloud microservices, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). It should also be noted that "services" or "microservices" may be used interchangeably with "applications" and "processes" herein. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application program interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on-demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase, particularly as computing power and the use of IoT devices continue to advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, moving sensitive workloads to the cloud requires a secure cloud infrastructure. For example, the process of moving certain workloads to cloud for computation efficiency assumes (e.g., requires) the cloud to be secure. While conventional container orchestration platforms have provided some security measures for cloud workloads, they are fragmented and inefficient at protecting against advanced threats, e.g., such as Layer-7 threats. These conventional platforms are also unable to scale properly, thereby limiting application of a platform to a select set of circumstances.

In sharp contrast to these conventional shortcomings, approaches herein are desirably able to implement policy (e.g., security policy) enforcement in real-time with minimal overhead to memory, caused at least in part by utilizing probabilistic data structures. For instance, by auditing requests that are sent between applications (e.g., services), sketch algorithms herein are able to extract audit logs to summarize while simultaneously consuming less memory. Approaches herein are thereby able to prevent a variety of attacks, including HTTP GET DOS, misusing leaked auth tokens, etc. Furthermore, approaches are able to reduce memory footprint by over 50% in comparison to conventional products, while achieving a negligible loss in accuracy, e.g., as will be described in further detail below (e.g., see FIGS. 4A-4C).

Figure 2A:
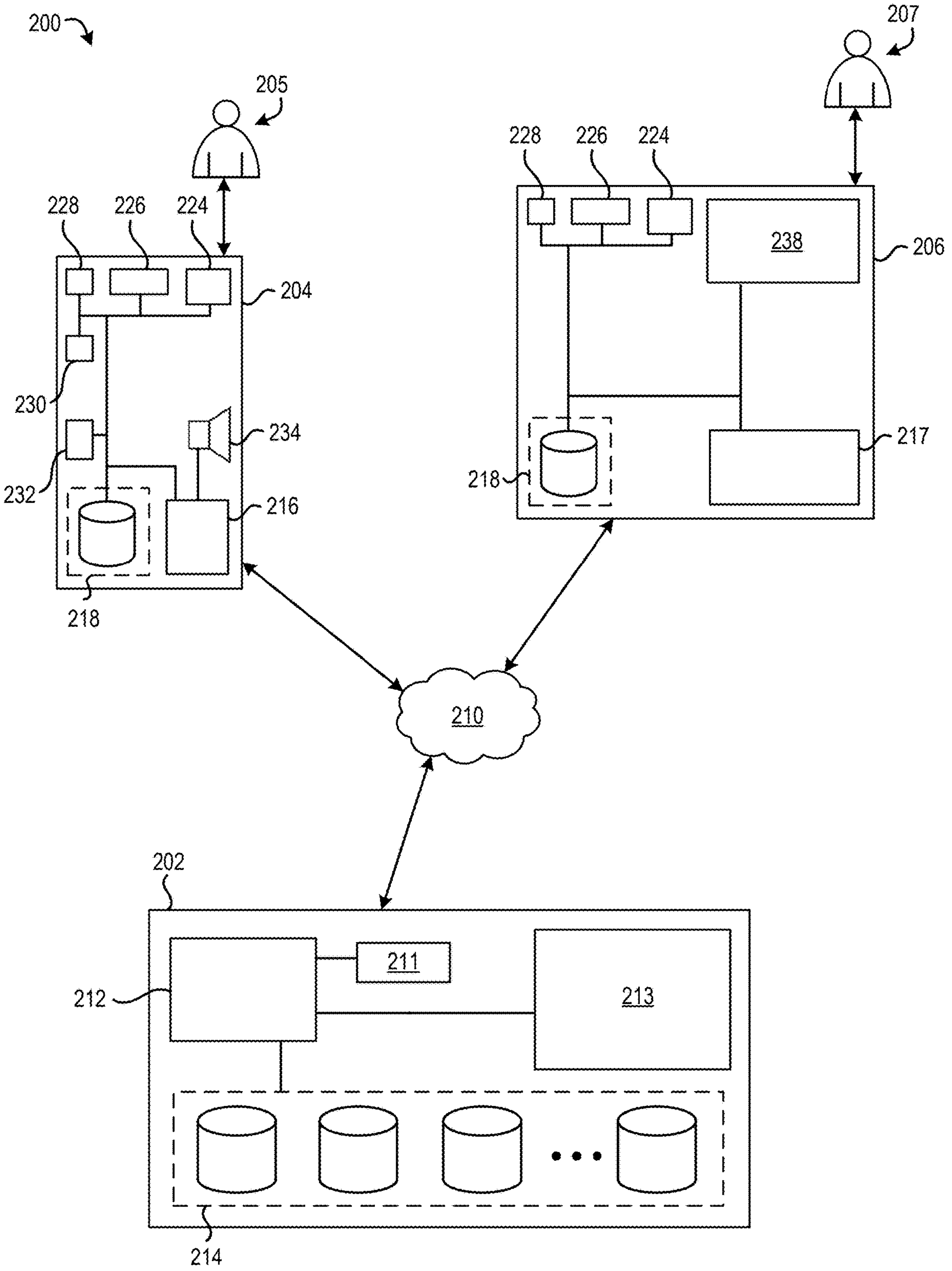
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The user device 204 and edge node 206 may thereby be considered "endpoint devices," each of which are connected to the central server 202. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data," "datasets," "metadata," and "information" herein are in no way intended to be limiting either, and may include any desired type of details, e.g., depending on the type of operating system implemented on the user device 204, edge node 206, and/or central server 202. In some approaches, datasets of textual entries (e.g., strings of alphanumeric characters) that are generated at the edge node 206 may be kept at the edge node 206 to ensure data security and retention. For example, datasets having sensitive information (e.g., personal data, financial data, intellectual property, etc.) may intentionally be retained at an edge server where the datasets were formed. However, other information deemed as not being sensitive may be sent to the central server 202 from user device 204 and/or edge node 206 for processing using one or more machine learning models.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 includes models that have been trained to evaluate network traffic (e.g., received application requests) in real-time and identify requests with malicious intent. It follows that the AI module 213 may include one or more context-aware multi-model evaluators that are able to (along with processor 212) inspect a wide range of queries and apply one or more desired security policies to prevent malicious attempts that may be received, e.g., from endpoint devices 204, 206 or any other devices that are connected to network 210. With respect to the present description, a "context-aware multi-model evaluators" refers to one or more models that have been trained such that they are configured to receive a request (e.g., an application request), extract contextual information like Layer 7 metadata from the received request and/or other requests, determine whether the received request is malicious based at least in part on the extracted contextual information, and ultimately implement desired security policies. It follows that AI module 213 and/or processor 212 may be used to perform one or more of the operations in method 300 below to efficiently evaluate the security of a received application request and determine whether it should be processed, e.g., as will be described in further detail below.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Requests may be submitted by user 205 using user device 204 and central server 202. For instance, requests that involve non-sensitive topics and/or data may be received from user 205 through user device 204 for implementation and/or evaluation using AI module 213 at central server 202. In other approaches, one or more requests may be received at central server 202 from applications (e.g., services) that are running at the user device 204 and/or edge node 206. The requests may be received as a result of the user 205 and/or administrator 207 using one or more applications, software programs, temporary communication connections, etc., running on the user device 204 and/or edge node 206. For example, the user 205 may use user device 204 to enter (e.g., type) and upload a query to be evaluated and solved using processor 212 and/or AI module 213 of central server 202. As a result, a context-aware multi-model evaluator at the central server 202 may be used to efficiently evaluate and process even complex requests. In another example, the requests may be microservice requests, e.g., as would be appreciated by one skilled in the art after reading the present description.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238.

As described above with respect to AI module 213, the AI module 238 may include any desired number and/or type of AI-based models, e.g., such as machine learning models, deep learning models, neural networks, etc. However, in preferred approaches the AI module 238 includes models that have been trained to evaluate network traffic (e.g., received application requests) in real-time and identify requests with malicious intent. It follows that the AI module 238 may include one or more context-aware multi-model evaluators that are able to (along with controller 217) inspect a wide range of queries and apply one or more desired security policies to prevent malicious attempts that may be received. As noted above, a "context-aware multi-model evaluators" refers to one or more models that have been trained such that they are configured to receive a request (e.g., an application request), extract contextual information (e.g., such as Layer 7 metadata) from the received request and/or other requests, determine whether the received request is malicious based at least in part on the extracted contextual information, and ultimately implement desired security policies. It follows that AI module 238 and/or controller 217 may be used to perform one or more of the operations in method 300 below to efficiently evaluate the security of a received application request and determine whether it should be processed, e.g., as will be described in further detail below.

Figure 2B:
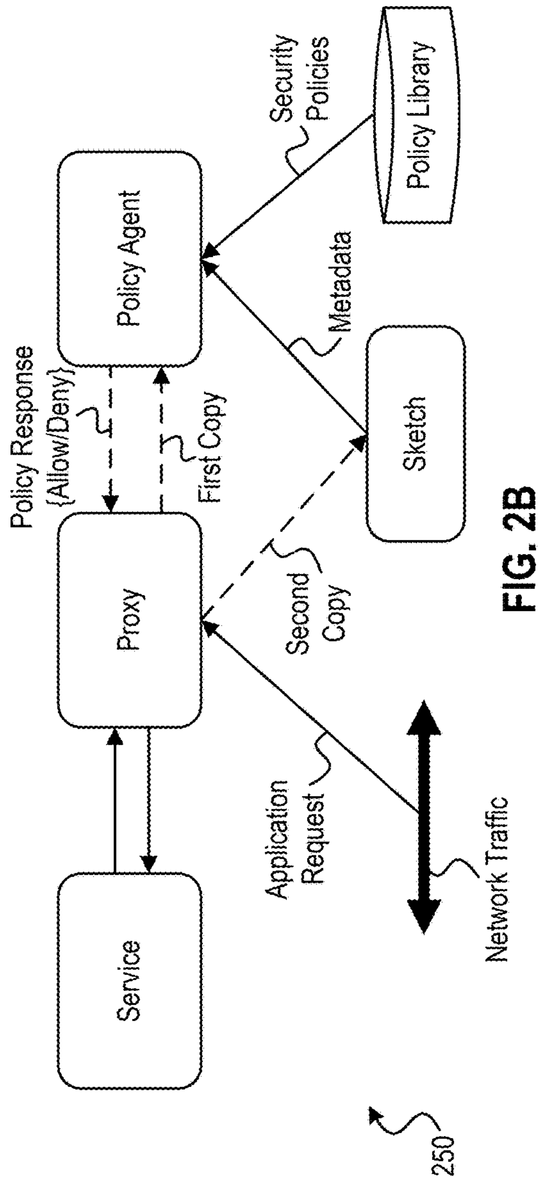
FIG. 2B is a representational view of a sub-system configured to evaluate service requests, in accordance with one approach.
Figure 2C:
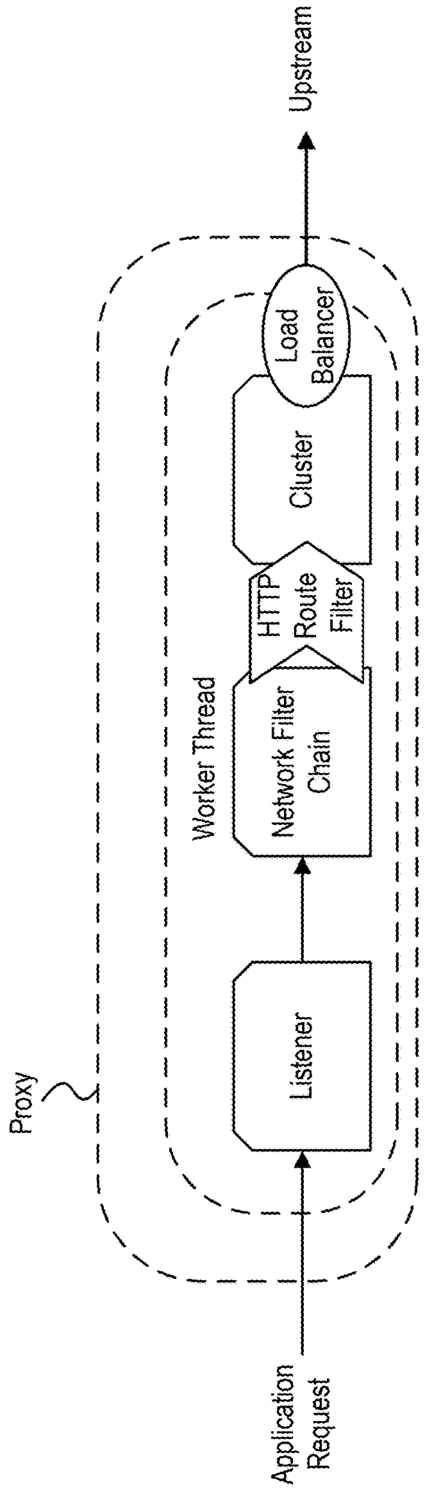
FIG. 2C is a detailed representational view of the Proxy in FIG. 2B, in accordance with one approach.
Figure 2D:
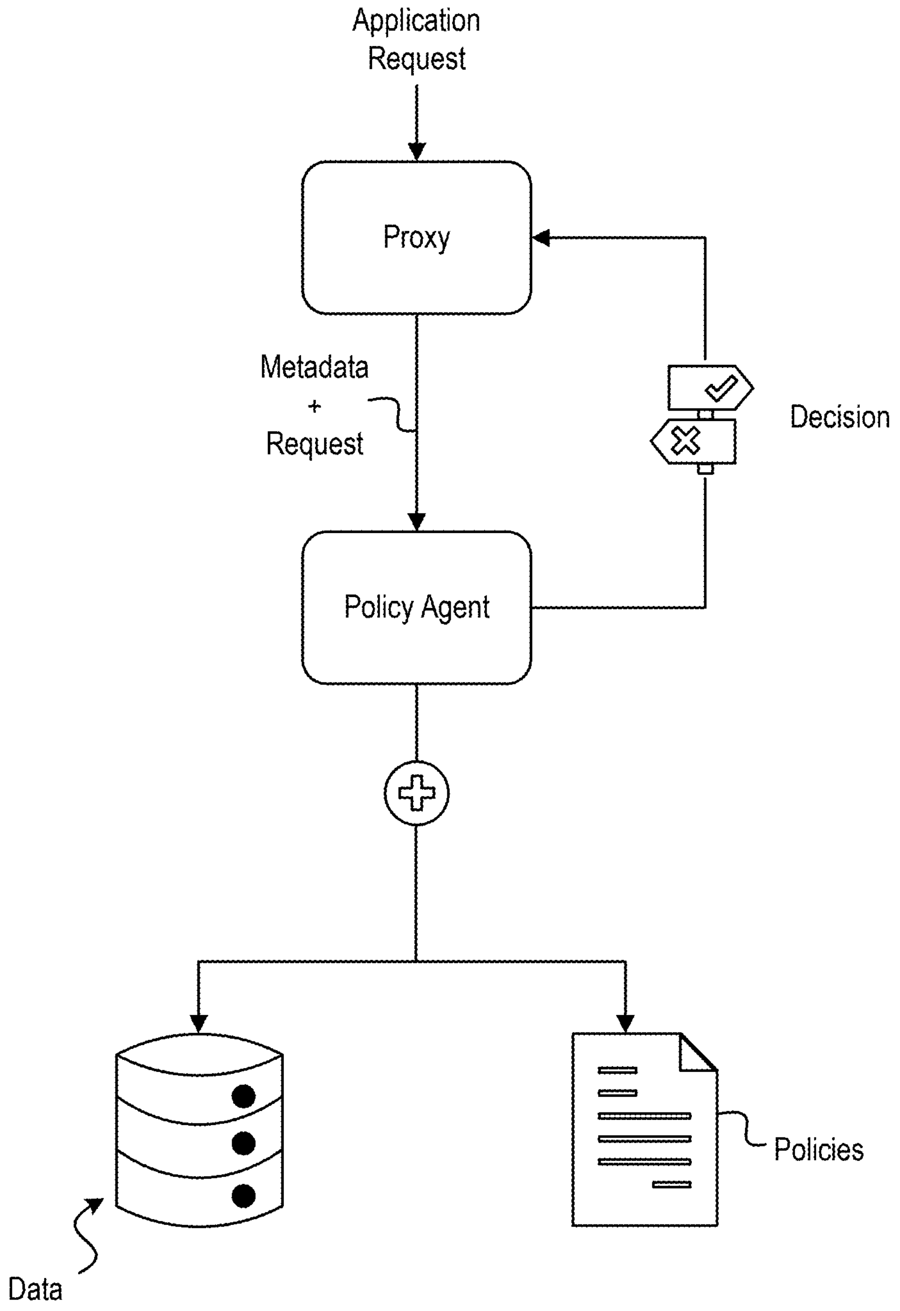
FIG. 2D is a representational view of a flowchart, in accordance with one approach.

Looking now to FIGS. 2B-2D, different representational views of components and processes that may be used to evaluate received application requests and/or other network traffic are illustrated in accordance with several approaches which are in no way intended to be limiting. Various ones of the components and/or processes may be implemented in software and/or hardware, e.g., as desired. Accordingly, these components and/or processes may be used in system 200 of FIG. 2A, e.g., to evaluate whether received requests should be satisfied, e.g., as would be appreciated by one skilled in the art after reading the present description.

Looking first to FIG. 2B, there a sub-system 250 configured to evaluate service requests is illustrated in accordance with one approach. For instance, the Proxy monitors Network Traffic and identifies certain requests (e.g., instructions, commands, queries, etc.) of interest to evaluate for authenticity. The Proxy typically identifies requests that are intended for Service as "requests of interest" during operation of sub-system 250 and/or an overarching system (e.g., system 200). For instance, some requests may be compared against one or more security policies to determine whether the requests are malicious. In other words, one or more security policies may be applied to the requests to determine whether the requests are legitimate or malicious. However, during a training phase of the sub-system 250, Proxy may route all network traffic to Sketch and/or Policy Agent to develop an understanding of typical network loads, e.g., as will be described in further detail below. In some approaches, the Proxy includes Envoy Proxy, but the Proxy may include any desired type of edge and service proxy, or other type of proxy.

In response to receiving (e.g., extracting) an application request of interest at Proxy, two copies of the service request are made. A first copy of the service request is forwarded to the Policy Agent, while the second copy of the service request is forwarded to the Sketch. The Sketch (or sketch algorithm) is preferably configured to extract metadata from the received copy of the application request. For instance, the Sketch may be configured to extract Layer 7 metadata from the received copy of the application request, e.g., such as service names, authentication tokens, URL paths, session tokens, cookies, HTTP response codes, etc., or any other metadata that may assist in gaining an accurate understanding of the received service request. It should be noted that as used herein, "Layer 7 metadata" is intended to refer to any information that corresponds to the "Application Layer," or highest level of the Open Systems Interconnection (OSI) model. The Application Layer interfaces with and provides services to application software running on host devices, thereby facilitating end-user and application interactions. Accordingly, Layer 7 metadata is able to provide a wide variety of information about the network traffic portion of such interactions. For example, Layer 7 metadata may also include source Internet Protocol (IP) information, HTTP addresses, response request details, etc., e.g., as would be appreciated by one skilled in the art after reading the present description.

Metadata that is extracted by the Sketch may further be stored utilizing probabilistic data structures. For instance, by auditing requests that are sent between applications (e.g., services), sketch algorithms herein are able to extract audit logs to summarize while simultaneously consuming less memory. Approaches herein are thereby able to prevent a variety of attacks, including HTTP GET DOS, misusing leaked auth tokens, etc. Furthermore, approaches are able to reduce memory footprint by over 50% in comparison to conventional products, while achieving a negligible loss in accuracy, e.g., as will be described in further detail below (e.g., see FIGS. 4A-4C).

Metadata extracted by the Sketch is forwarded along to the Policy Agent. Thus, the Policy Agent may use the metadata while determining whether the first copy of the application request satisfies one or more Security Policies. The Policy Agent has access to a Policy Library in which the one or more security policies and/or other access control policies may be stored and implemented, e.g., depending on the service requests that are received. In some approaches, the Policy Agent is an Open Policy Agent, but any desired type of policy agent may be used to compare the extracted metadata to the one or more relevant security policies. For instance, by extracting and evaluating Layer 7 metadata, approaches herein are able to implement policies that are based on details such as service names, authentication tokens, URL paths, session tokens, cookies, HTTP response codes, etc.

According to an example, a source IP address may be extracted from a received application request, and used to identify a source where the request was issued from. Information associated with past application requests that is stored in memory may be used along with the extracted source IP address to identify: how many requests, the types of requests, the sequence of requests, etc., that have been received from the same source in a given amount of time. In another example, the content of HTTP request body (e.g., such as policy limiting #POST requests for John Doe's data) may be extracted from a received application request and evaluated. The HTTP responses for sensitive tokens may be extracted from requests and analyzed, in another example. In still another example, a distribution of source IPs using the same authentication token(s) may be extracted and/or formed from a received request.

In response to comparing the extracted metadata and copy of the application request to the one or more security policies, the Policy Agent returns a Policy Response to the Proxy, which effectively Allows or Denies the application requestion from reaching the intended Service target. The Proxy may thereby implement the Policy Response. Application requests determined as satisfying the security policies may be forwarded to the Service, and any responses (e.g., data, metadata, replies, returned requests, instructions, etc.) produced by the Service as a part of satisfying or at least evaluating the received application request, may be returned to Proxy, e.g., for storage, to resubmit in the Network Traffic, etc.

Looking now to FIG. 2C, a more detailed representational view of the Proxy is illustrated in accordance with one approach. Any of the components shown in FIG. 2C and/or described herein may be implemented in the Proxy of FIG. 2B, e.g., as would be appreciated by one skilled in the art after reading the present description.

The Proxy is shown as having a Worker Thread that receives the Application Requests, and processes the requests with a Listener. The Listener corresponds to particular addresses and ports, and may be used to establish connections and/or requests. In some approaches, more than one listener may be used by the Proxy to listen to more than one different IP and port combination.

From the Listener, the Worker Thread advances the received Application Request to a Network Filter Chain which references a number of filters (e.g., HTTP Filter, TCP Filter, etc.), and identifies the filter to apply to the Application Request. Accordingly, the HTTP Route Filter is shown as being passed to the Cluster for implementation. For instance, the Load Balancer may be used to distribute the Application Request as desired. For example, the Load Balancer may create a second copy of application requests identified as being potentially malicious (e.g., based on extracted Layer 7 metadata). The two copies of an application request may thereby be sent Upstream, e.g., to a policy agent and sketch algorithm simultaneously.

Referring now to FIG. 2D, a flowchart depicting a procedure of how a received application request may be evaluated and selectively implemented is illustrated, which is in no way intended to be limiting. As shown, an Application Request is received at the Proxy and metadata is extracted from the request. For example, Layer 7 metadata outlining the target location(s) for the received request may be extracted by the Proxy. In some approaches, this Layer 7 metadata includes specific JSON values that identify the target locations.

As shown the extracted metadata is provided to the Policy Agent, preferably along with a copy of the actual request. The Policy Agent may thereby use the metadata and/or any other information associated with the actual request to determine whether the request should actually be performed. This determination is made in some approaches by referencing one or more Policies (e.g., security policies) that outline the types and/or numbers of application requests that may be performed based on a number of factors. For example, a specific application or source location may be limited to issuing a certain number of requests in a predetermined amount of time, as outlined in the Policies.

In some approaches, the Policies are developed in response to evaluating network traffic and developing an understanding of typical (e.g., non-malicious) requests. Accordingly, information associated with past requests and how they were satisfied may be stored in the Data in any desired format, e.g., such as JSON. In some approaches, this information may be used to train one or more AI based models that generate and/or manage the Policies that are used to evaluate incoming requests, e.g., as will be described in further detail below.

Figure 3A:
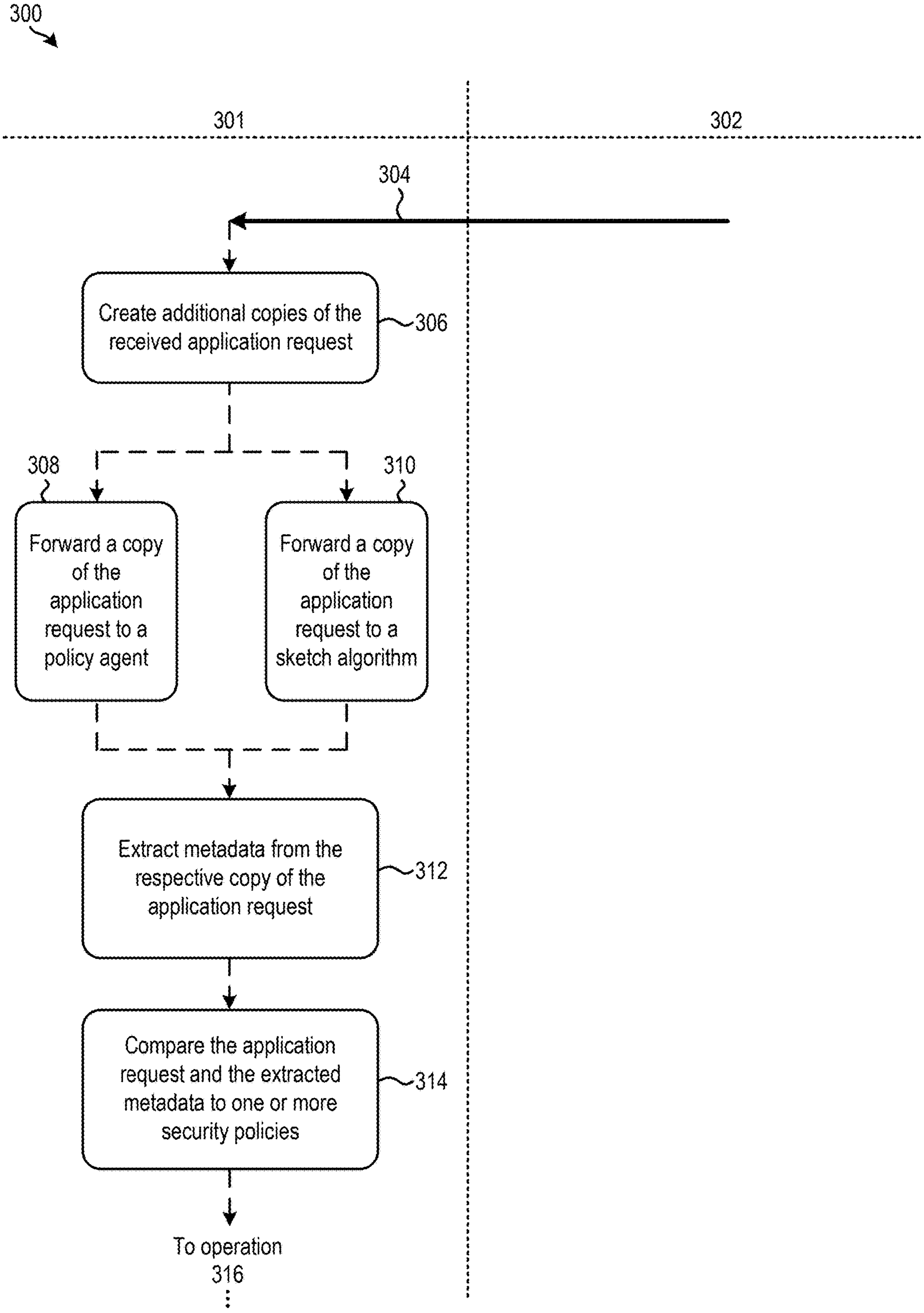
FIG. 3A is a flowchart of a method, in accordance with one approach.
Figure 3A:
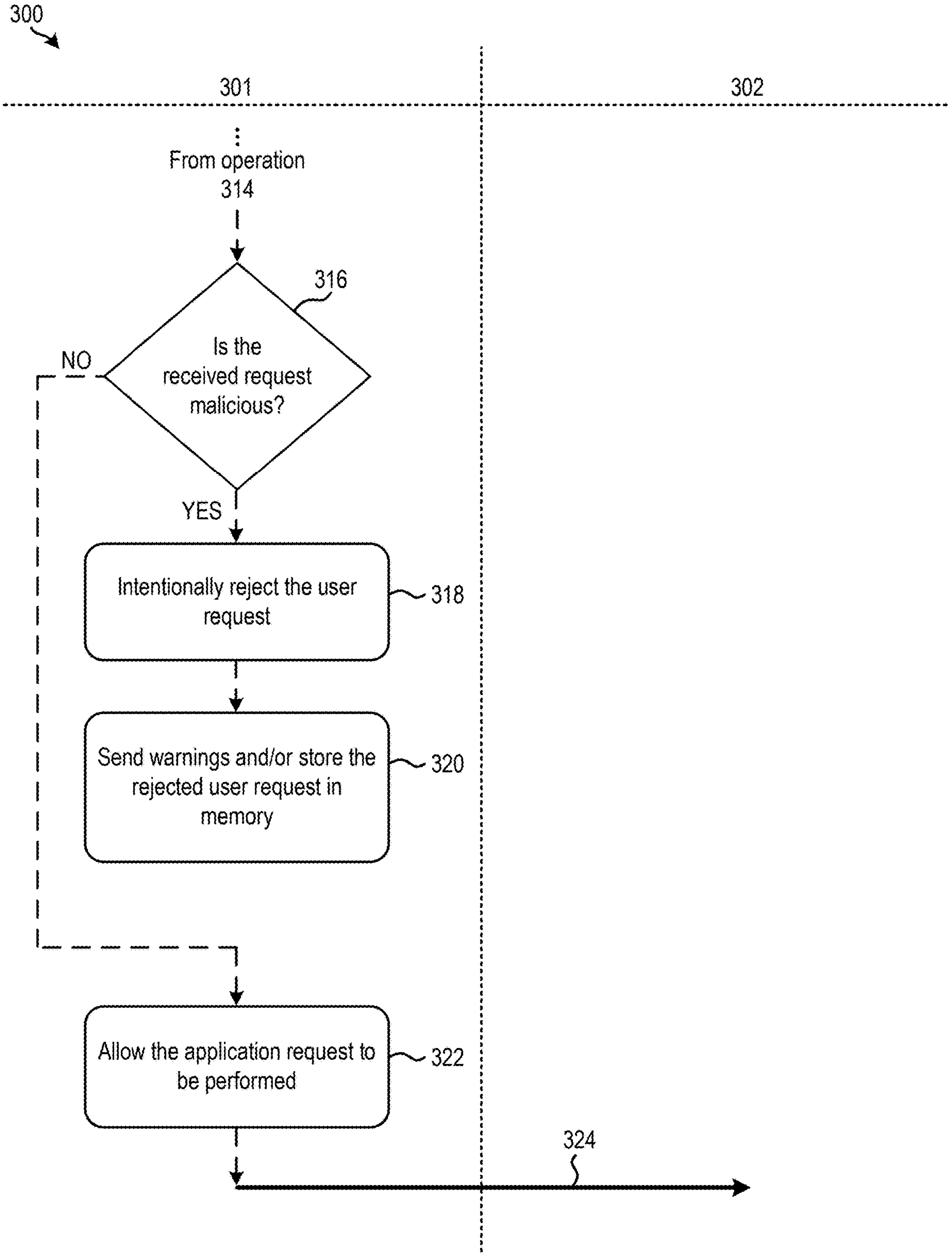

Looking now to FIG. 3A, a flowchart of a computer-implemented-method 300 for sketch based network traffic summarization in real-time is illustrated in accordance with one approach. In other words, method 300 includes developing and maintaining security policy enforcement by utilizing metadata, particularly Level 7 metadata, and probabilistic data structures to analyze incoming application requests. Approaches herein are thereby able to achieve accelerated security policy assessments by collecting and evaluating metadata in real-time, which is particularly desirable for cloud microservices.

The method 300 may be performed in accordance with the present invention in any of the environments depicted in FIGS. 1-2D, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. For example, the nodes 301, 302 shown in the flowchart of method 300 may correspond to one or more processors positioned at a different location in a distributed system. Moreover, each of the one or more processors are preferably configured to communicate with each other.

In various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, each of which represent one or more processors, controllers, computer, etc., positioned at a different location in a distributed system. For example, in some approaches one or more of the operations in method 300 may involve one or more components in a sub-system configured to evaluate service requests (e.g., see sub-system 250 of FIG. 2B), which may be implemented in an AI based module (e.g., see AI modules 213, 238 of FIG. 2A). Accordingly, node 301 may include one or more processors and/or AI based models which are located at a central server of a distributed system (e.g., see processor 212 and/or AI module 213 of FIG. 2A above). In another approach, node 302 may include one or more processors which are located at an endpoint device of a distributed system (e.g., see controller 217 and/or AI module 238 of FIG. 2A above). Accordingly, commands, code, data, metadata outlining code updates, etc. may be sent between the nodes 301, 302 depending on the approach. It should also be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

As shown, operation 304 originates at node 302, and sends an application request to node 301. The application request may thereby correspond to one or more applications that are running at node 301. For example, a first application running at node 302 that depends on (e.g., references) the output of a second application running at node 301, may request the output of the second application from node 301.

In response to receiving the application request at node 301, operation 306 includes creating additional copies of the received application request. For instance, at least a second copy of the application request may be formed. Proceeding from operation 306, method 300 advances to operations 308 and 310 in parallel. There, operation 308 includes forwarding a first copy of the application request to a policy agent, while operation 310 includes forwarding a second copy of the application request to a sketch algorithm. It follows that operations 308 and 310 may be performed in parallel, e.g., such that the copies of the application request are forwarded to the policy agent and the sketch algorithm simultaneously. This allows for the policy agent and the sketch algorithm to begin evaluating the respective copies of the application request in parallel, thereby decreasing latency.

Method 300 is shown as advancing from operations 308 and 310 to operation 312. There, operation 312 includes extracting metadata from the respective copy of the application request. In some approaches, operation 312 is performed by sending one or more instructions that cause the sketch algorithm to extract metadata from the copy of the application request that was sent thereto. The metadata that is extracted from the application request is preferably sufficient to determine an accurate understanding of the received request. For instance, operation 312 may include extracting Layer 7 metadata from the application request, e.g., such as service names, authentication tokens, URL paths, session tokens, cookies, HTTP response codes, etc. This extracted information may thereby be used to evaluate the received request and determine its authenticity.

Figure 3B:
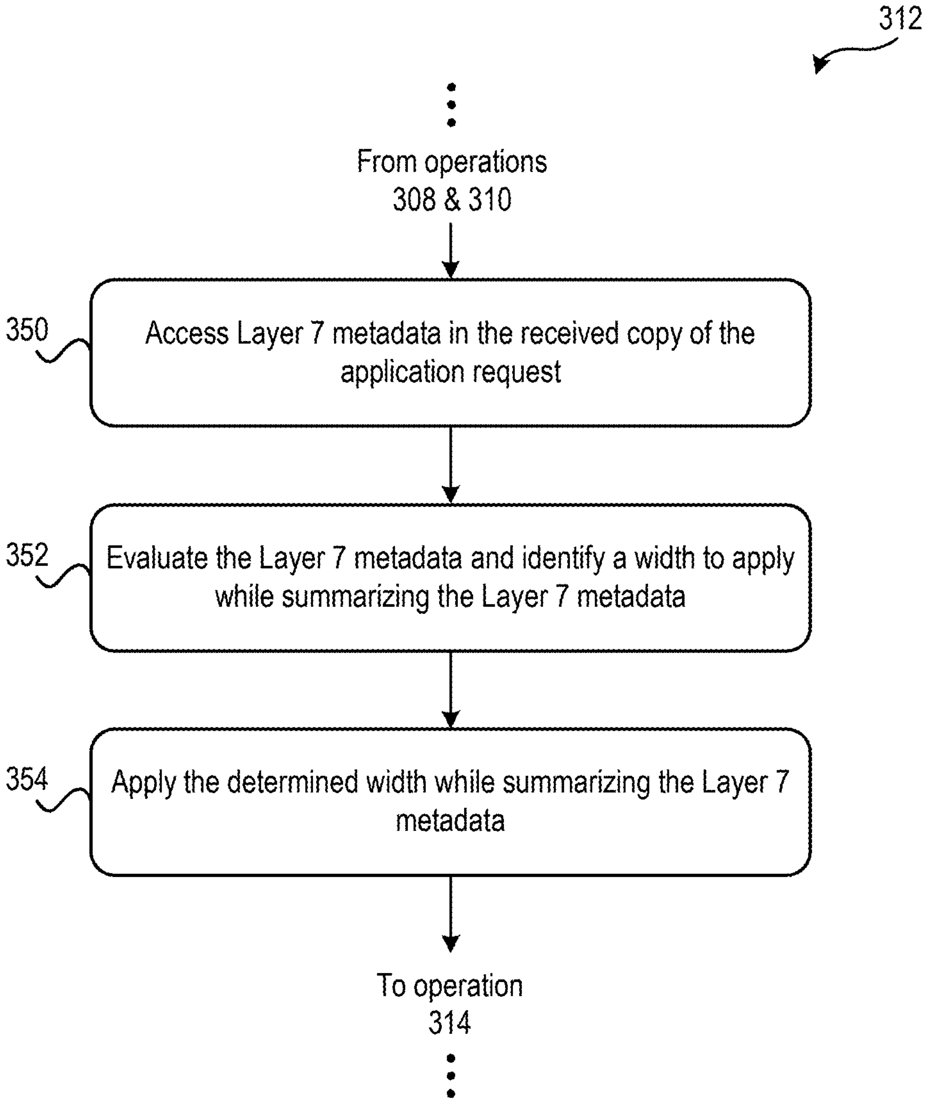
FIG. 3B is a flowchart of sub-operations for one of the operations in the method of FIG. 3A, in accordance with one approach.

For instance, referring momentarily now to FIG. 3B, exemplary sub-operations of extracting metadata from a copy of the application request are illustrated in accordance with one approach. It follows that one or more of these sub-operations may be used while causing the sketch algorithm to extract metadata from the respective copy of the application request, e.g., as outlined in operation 312 of FIG. 3A. However, it should be noted that the sub-operations of FIG. 3B are illustrated in accordance with one approach which is in no way intended to be limiting.

As shown, sub-operation 350 includes accessing Layer 7 metadata in the received copy of the application request. As noted above, the Layer 7 metadata may be accessed in some approaches by extracting the metadata from the application request itself. In other approaches, the metadata may be accessible in a public lookup table, in the network traffic, etc. Moreover, sub-operation 352 includes evaluating the Layer 7 metadata and identifying the width to apply while summarizing the Layer 7 metadata. For instance, sub-operation 352 may include identifying the width a sketch algorithm should implement based on the available metadata. It should also be noted that the "width" of a sketch algorithm intends to refer to the amount of memory that is allocated to the algorithm. Thus, sketch algorithms implementing greater widths have more memory allocated, while sketch algorithms implementing leaner (e.g., narrower) widths have less memory.

The width that is applied to the sketch algorithm may change over time. For instance, performance experienced during a training phase of the sketch algorithm may be used to determine an initial width value. However, approaches herein have identified that the diversity of network traffic experienced actually impacts the preferred (e.g., ideal) width that is implemented by a sketch algorithm. Thus, as performance changes over time, the width is also preferably updated accordingly.

Figure 3C:
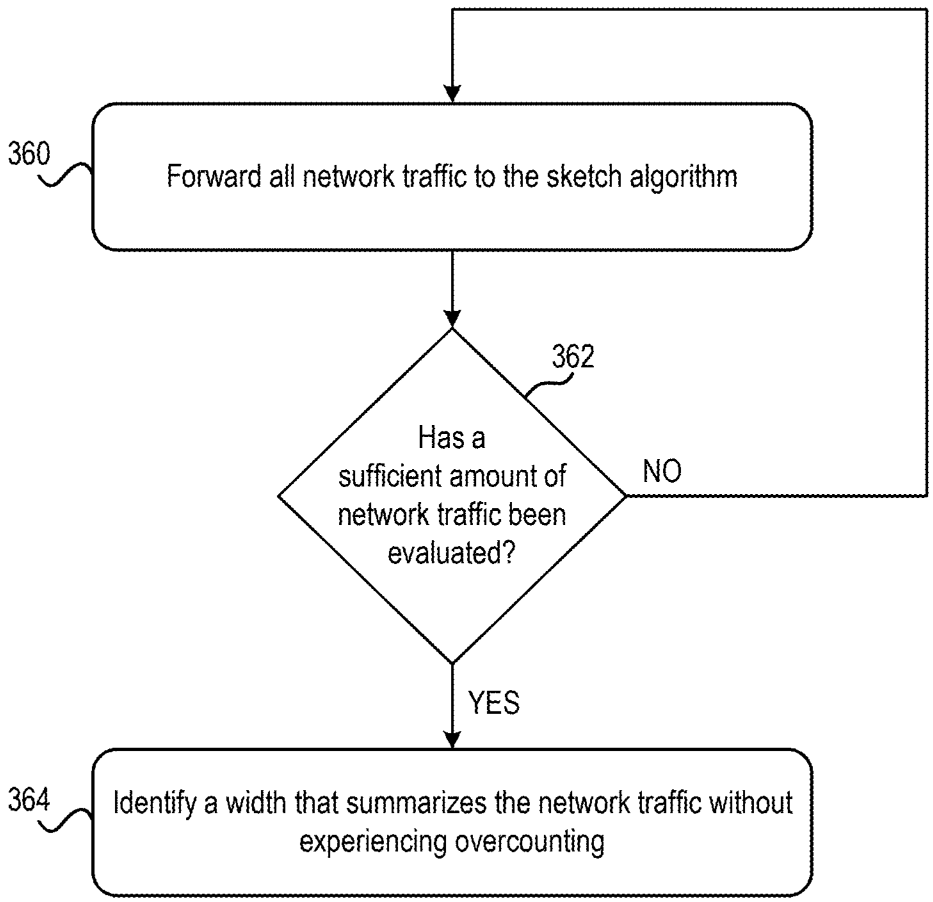
FIG. 3C is a flowchart of steps for one of the sub-operations in FIG. 3B, in accordance with one approach.
Figure 3D:
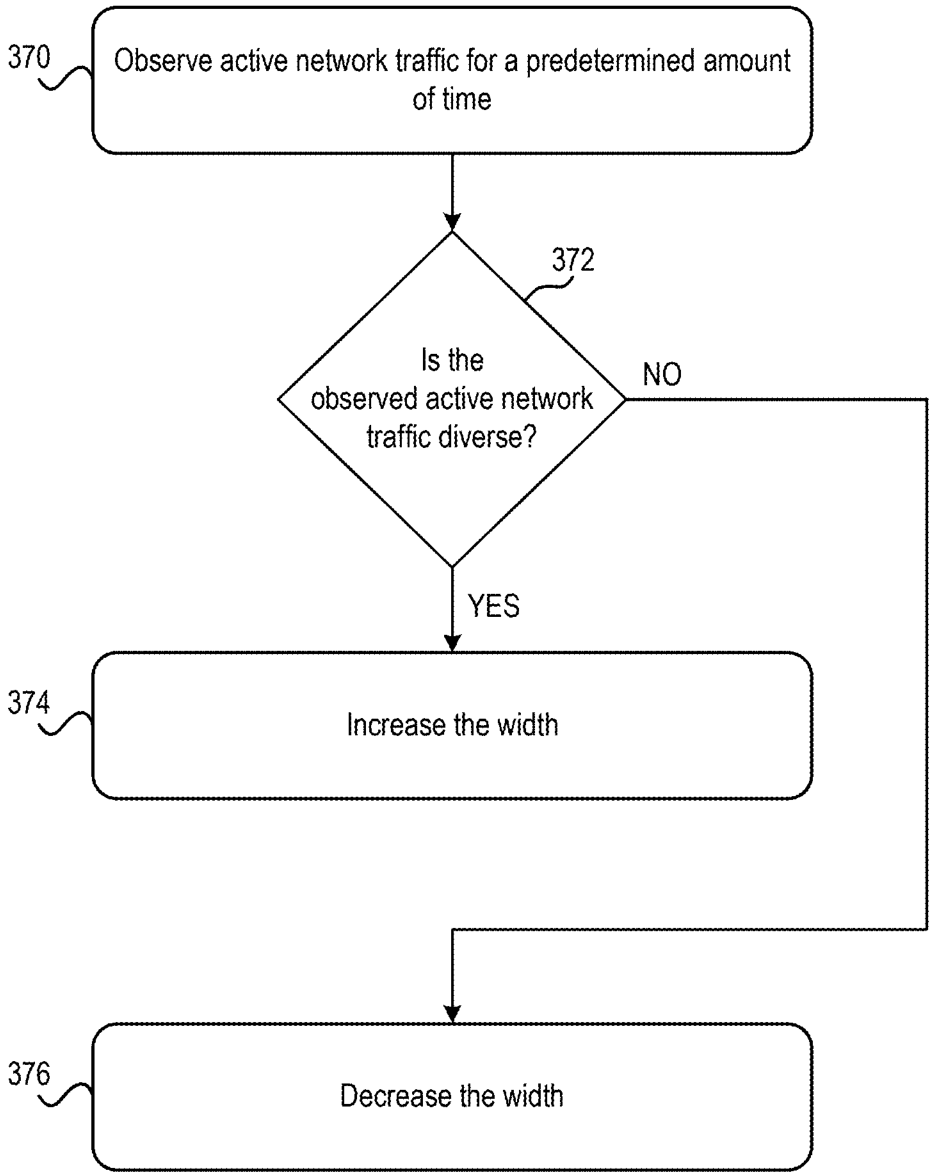
FIG. 3D is a flowchart of steps for one of the sub-operations in FIG. 3B, in accordance with another approach.

FIGS. 3C & 3D each show a series of steps that may be taken at different stages of the sketch algorithm. For instance, FIG. 3C includes a series of steps that may be performed to identify one or more widths during a training phase of the sketch algorithm. In other words, the steps in FIG. 3C may be performed before using the sketch algorithm to satisfy requests in real-time.

As shown, step 360 includes causing all network traffic to be forwarded to the sketch algorithm. In some approaches, step 360 includes sending one or more instructions that cause the policy agent to forward all network traffic to the sketch algorithm for evaluation. As mentioned above, the sketch algorithm may include one or more AI models, which may be trained using the network traffic. The models may thereby be trained by evaluating the network traffic that is received. As a result, the models may be configured to identify a width that most effectively summarizes the network traffic without experiencing overcounting, e.g., as will soon become apparent.

Proceeding to step 362, a determination is made as to whether a sufficient amount of network traffic has been evaluated. In other words, step 362 includes determining whether the sketch algorithm has been trained using a desirably large sample size. Training the sketch algorithm using too little network traffic may result in the sketch algorithm performing undesirably, e.g., by overcounting and/or consuming an unnecessary amount of memory. Step 362 may compare current sketch training progress to one or more predetermined training progressions in some approaches.

In response to determining that a sufficient amount of network traffic has not yet been evaluated, the flowchart is shown as returning to step 360, e.g., such that additional network traffic may be evaluated. However, in response to determining that a sufficient amount of network traffic has been evaluated, the flowchart proceeds from step 362 to step 364. It follows that step 362 thereby effectively causes the sketch algorithm to observe the network traffic for a predetermined amount of time.

There, step 364 includes identifying a width that summarizes the network traffic without experiencing overcounting. For example, the width may be set as the smallest memory allocation capable of summarizing a variety of events without experiencing overcounting. It follows that the width that is identified may be based at least in part on the network traffic evaluated and/or any patterns identified therein using one or more AI based models.

It follows that FIG. 3C is able to train the sketch algorithm to produce a width that can be implemented as a default, e.g., until a sufficient amount of real-time network traffic is experienced. Accordingly, FIG. 3D includes a series of steps that may be performed in situations where a sufficient amount of network traffic has been received (e.g., in real-time) and evaluated. In other words, the steps in FIG. 3D may be performed while implementing the sketch algorithm to satisfy requests in real-time.

As shown, step 370 includes observing active network traffic for a predetermined amount of time. The predetermined amount of time may be based on past performance (e.g., during a training phase of the sketch algorithm), user preference, industry standards, outputs generated by one or more AI based models, etc. Moreover, step 370 preferably includes causing the sketch algorithm to observe the active network traffic for the predetermined amount of time, e.g., as would be appreciated by one skilled in the art after reading the present description.

From step 370, the flowchart proceeds to step 372. There, step 372 includes determining whether the observed active network traffic is diverse. In other words, step 372 includes comparing the active footprint of the network traffic to a predetermined range in order to calibrate the current network traffic. The range may be predetermined based at least in part on information used during a training phase of the sketch algorithm (e.g., see FIG. 3C). In other approaches, the range may be predetermined by a user, based on industry standards, impacted by traffic experienced at other locations of a distributed system, etc. It should also be noted that "a predetermined range" is in no way intended to limit the invention. For instance, rather than determining whether a value is inside or outside a predetermined range, equivalent determinations may be made, e.g., as to whether a value is above a predetermined threshold, whether an absolute value is above a threshold, whether a value is below a threshold, etc., depending on the desired approach.

In response to determining that the observed active network traffic is diverse, the flowchart proceeds from step 372 to step 374. There, step 374 includes dynamically increasing the width. Increasing the width (e.g., on the fly) effectively allows for the sketch algorithm to summarize the diverse network traffic in an accurate manner and adjust performance based on the type of traffic currently being experienced. Wider sketch algorithms are less likely to experience overcounting errors, but this reduced error count is achieved by increasing memory usage. Accordingly, the flowchart is shown as proceeding from step 372 to step 376 in response to determining that the observed network traffic is not diverse. There, step 376 includes dynamically decreasing the width.

In other words, the sketch algorithm is able to dynamically adjust the implemented level of granularity based on the diversity and/or leanness of traffic that is observed. This allows for both lean and diverse traffic to be satisfied while maintaining efficient performance, e.g., as described herein. It should be noted that "diverse" network traffic intends to refer to network traffic that is evenly spread across a large number of locations, while "lean" network traffic refers to a larger amount of network traffic that is spread across relatively fewer locations. The width implemented by a sketch algorithm is thereby preferably adjusted to accommodate demand in real-time.

In still other approaches, portions of the network traffic that have been identified as being diverse may be separated from portions of the network traffic that have been identified as being lean (not diverse). Diverse network traffic may thereby be processed together using a common elevated sketch algorithm width, while lean network traffic is processed together using a reduced sketch algorithm width. Processing different types of network traffic separately allows for performance to be adjusted such that analysis is effectively performed. In some approaches, requests that involve diverse and narrow operations may be processed in parallel. For instance, requests identified as not being malicious may be sent either: (i) to a first sketch algorithm tuned to efficiently perform requests that involve narrow data operations, or (ii) to a second sketch algorithm tuned to efficiently perform requests that involve diverse data operations. In addition to avoiding malicious requests, this ensures requests are performed in an efficient manner and using preferred operating settings. This also desirably avoids false positives from being recorded by preventing the sketch from being saturated during diverse traffic.

Returning back to FIG. 3B, the flowchart proceeds from sub-operation 352 to sub-operation 354 in response to evaluating the metadata and identifying a width the sketch algorithm should implement. There, sub-operation 354 includes applying the determined width while summarizing the Layer 7 metadata. From sub-operation 354, FIG. 3B is shown as advancing to operation 314 of FIG. 3A.

Looking now to FIG. 3A operation 314 includes comparing the application request and the extracted metadata to one or more security policies. As noted above, this may be accomplished in some approaches by sending one or more instructions to a policy agent configured to use metadata (e.g., Layer 7 metadata) while determining whether an application request satisfies the security policies. The policy agent may thereby have access to a policy library in which the one or more security policies and/or other access control policies may be stored and implemented, e.g., depending on the service requests that are received.

According to an example, operation 314 may include extracting an authentication code from a received application request, and determine how many times the same authentication code has been used. Information associated with past application requests that is stored in memory may be used along with the extracted authentication code to determine how many requests have used the same authentication code; the locations, logical devices, and/or physical devices that have used the same authentication code; the types of requests that have used the same authentication code; etc. in a given amount of time. Overuse of the same authentication code may thereby be used to identify potentially malicious requests that should be evaluated further.

From operation 314, method 300 proceeds to operation 316. There, operation 316 includes determining whether the application request received in operation 304 is malicious. Accordingly, operation 316 determines whether the received request is actually illegitimate. As used herein, "legitimate" or "malicious" requests may be identified based at least in part on policy responses produced by policy agents. For example, an application request identified as not satisfying one or more security policies may be identified as a malicious request, while an application request identified as satisfying one or more security policies may be identified as a legitimate request. Operation 316 may thereby evaluate one or more weight values produced by policy agents to determine whether the request is illegitimate (e.g., intends to maliciously exploit aspects of the system).

Method 300 is shown as advancing from operation 316 to operation 318 in response to determining that the user request is illegitimate for some reason. There, operation 318 includes intentionally rejecting the user request. In addition to rejecting the user request, one or more warnings may be sent to a system administrator, the rejected user request may be stored in memory, the rejected user request may be used to perform model retraining, etc. See operation 320.

However, method 300 advances from operation 316 to operation 322 in response to determining that the user request is legitimate and not malicious. There, operation 322 includes allowing the application request to be performed. In other words, operation 322 includes causing the application request to be forwarded to a target application (e.g., service) for implementation. Moreover, in response to implementing the application request, confirmation and/or other information (e.g., responses, instructions, metadata, etc.) may be returned to requesting node 302. See operation 324.

It follows that method 300 is desirably able to achieve sketch based network traffic summarization in real-time. In other words, method 300 includes developing and maintaining security policy enforcement by utilizing metadata, particularly Level 7 metadata, and probabilistic data structures to analyze incoming application requests. Approaches herein are thereby able to achieve accelerated security policy assessments by collecting and evaluating metadata in real-time, which is particularly desirable for cloud microservices.

This is in stark contrast to the disadvantages that conventional products have suffered from, the most notable being consistently overcounting occurrences. These conventional products are limited to using algorithms that cannot be relied on for an accurate count of network events and other events. For instance, hash collisions contribute to these conventional algorithms being unable to maintain accurate counts. As a result, conventional products have been unable to perform efficiently and maintain an accurate understanding of current operating conditions.

Figure 4A:
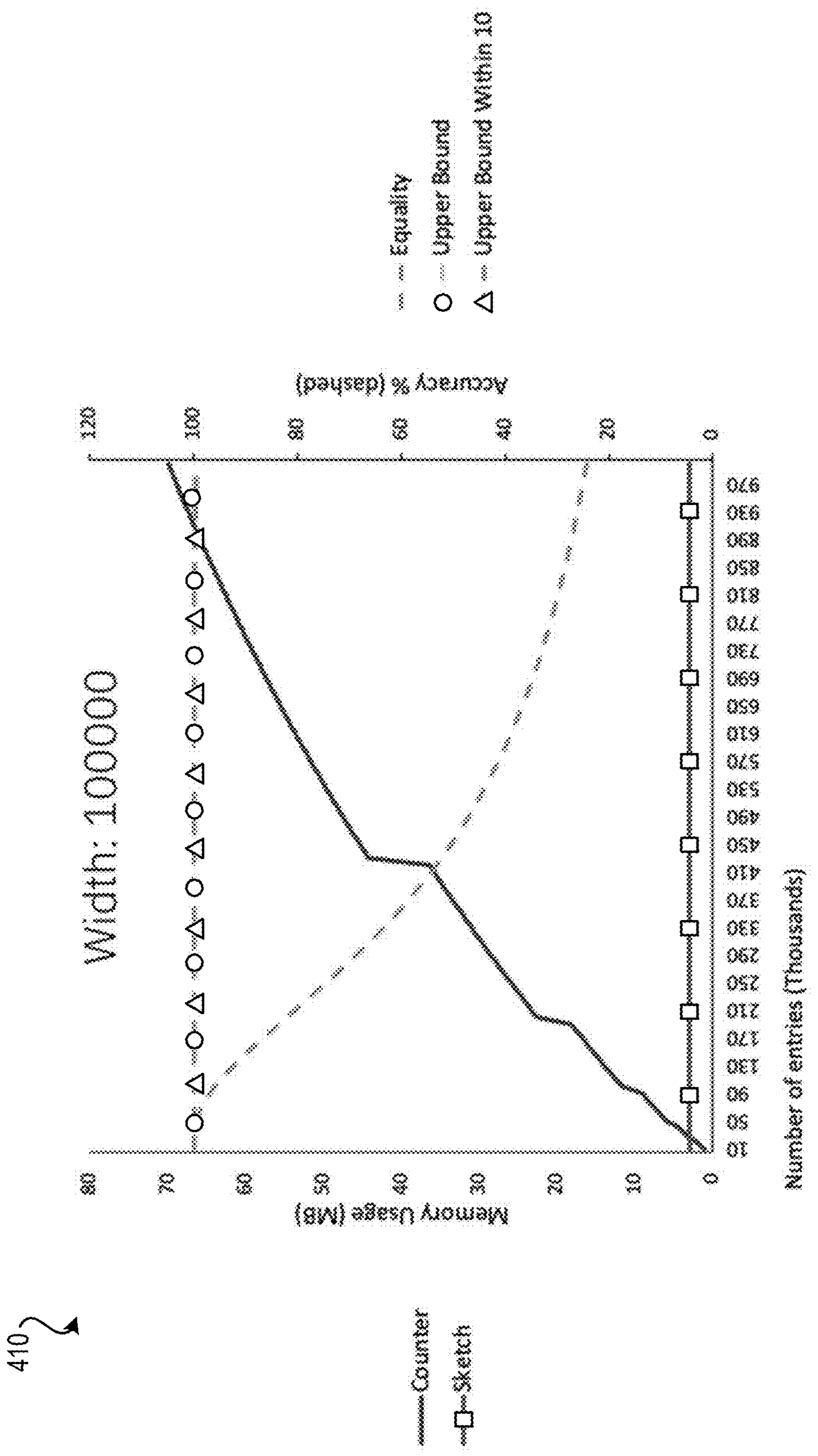
FIG. 4A is a graph that plots a number of entries vs. memory usage vs. accuracy percentage, in accordance with one approach.
Figure 4B:
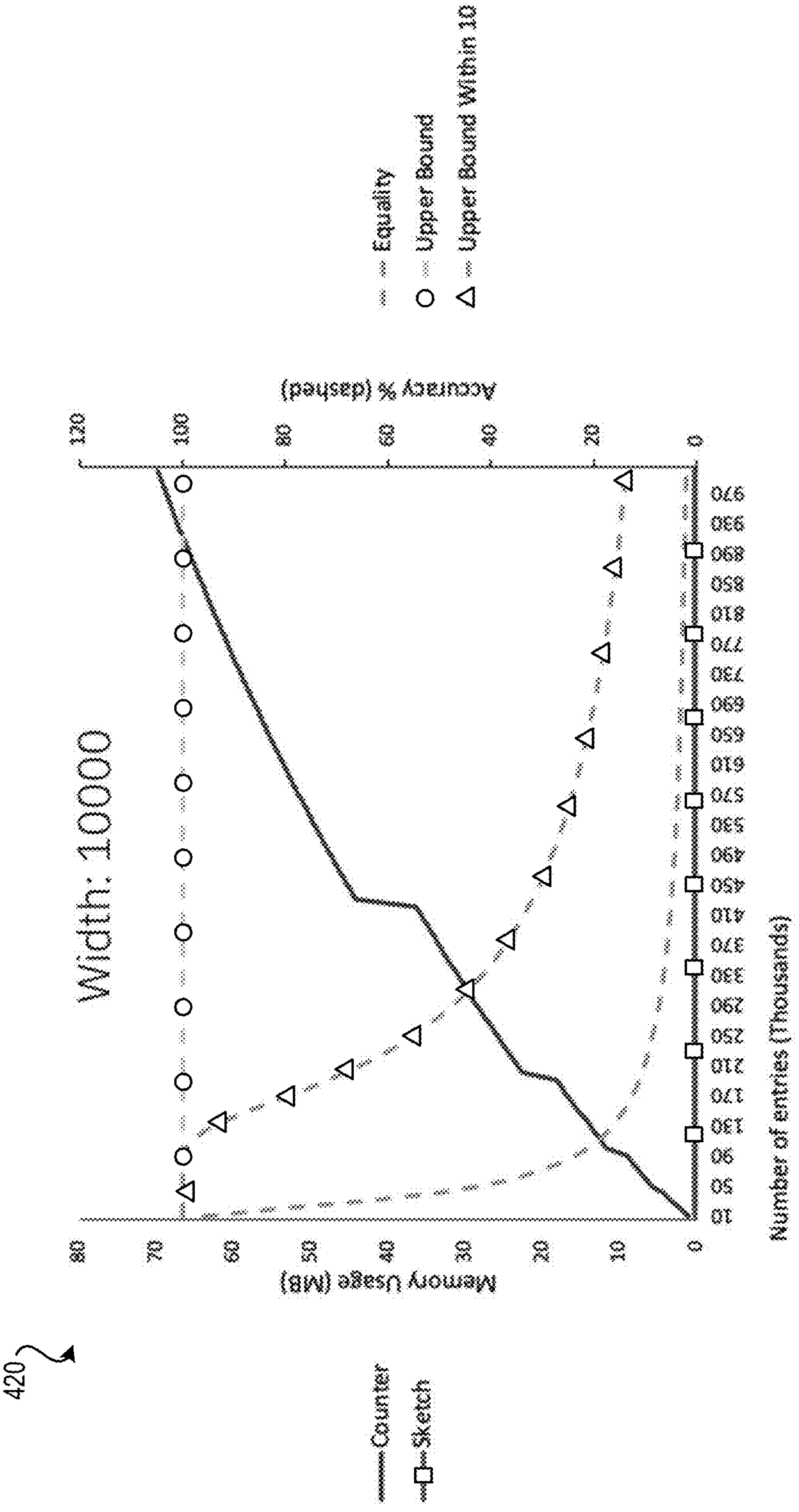
FIG. 4B is a graph that plots a number of entries vs. memory usage vs. accuracy percentage, in accordance with another approach.
Figure 4C:
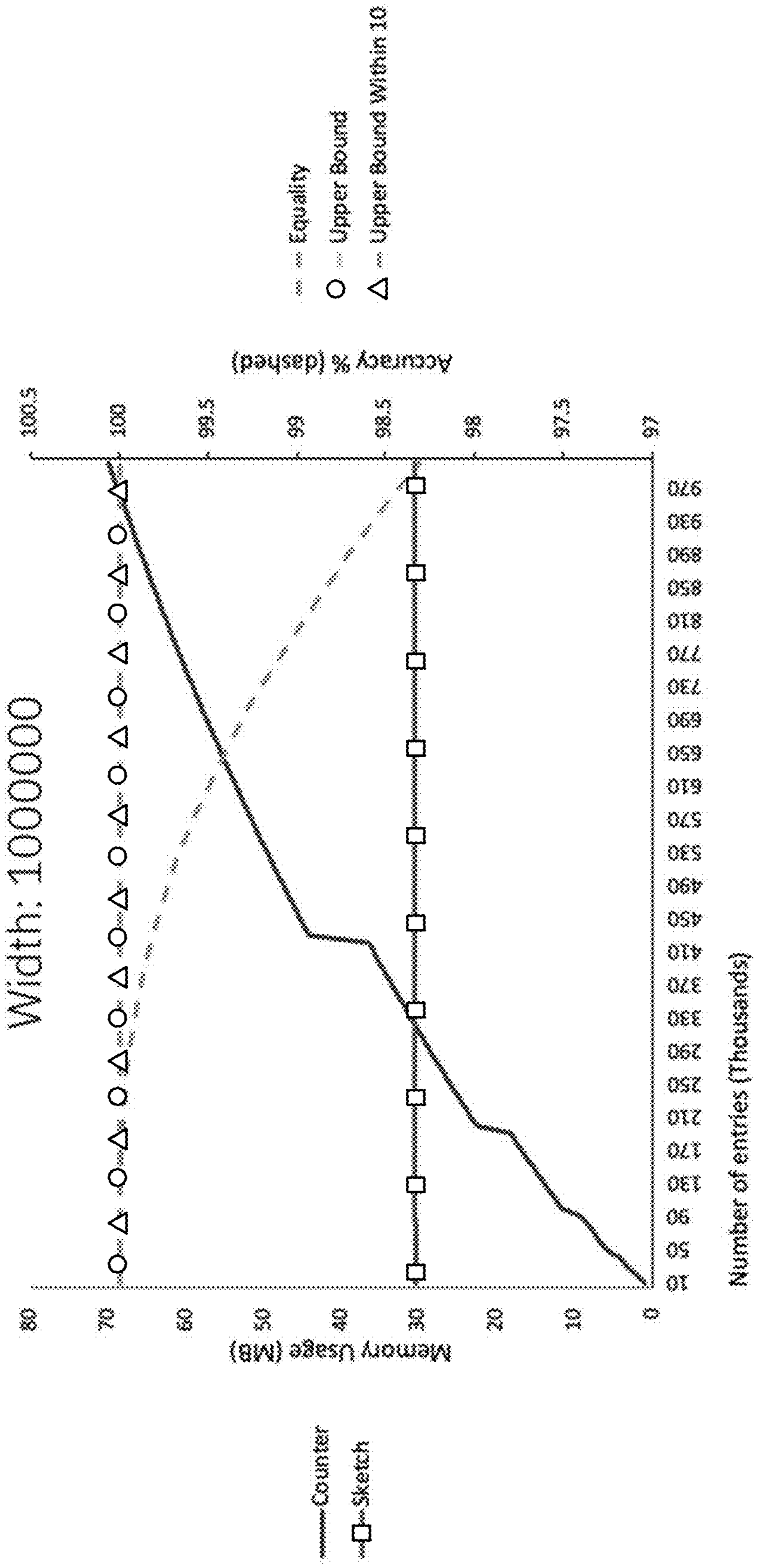
FIG. 4C is a graph that plots a number of entries vs. memory usage vs. accuracy percentage, in accordance with still another approach.

Looking now to FIGS. 4A-4C, graphs 410, 420, 430 each depict the performance improvements achieved by the approaches herein in accordance with three different in-use examples. As shown, the graphs 410, 420, 430 plot the number of entries (in the thousands) along the x-axis, while the primary y-axis represents memory usage in Megabytes (MB). Moreover, the secondary y-axis depicts accuracy percentage for each implementation, as represented by the dashed plot lines in graphs 410, 420, 430. It should also be noted that the "Equality" plot is determined using Equation 1 below. Moreover, the "Upper Bound" plot is determined using Equation 2 below, while the "Upper Bound Within 10" plot is determined using Equation 3 below. However, these equations are in no way intended to be limiting.

$$\text{Equality} = \frac{\#\text{entries in sketch with correct count}}{\text{Total }\#\text{entries}} \times 100 \qquad \text{Equation 1}$$

$$UpperBound = \frac{\#\text{entries in sketch} > \text{correct count}}{\text{Total }\#\text{entries}} \times 100 \qquad \text{Equation 2}$$

$$UpperBound\text{ within }10 = \frac{\#\text{entries in sketch} < \text{correct count} + 10}{\text{Total }\#\text{entries}} \times 100 \qquad \text{Equation 3}$$

Looking first to FIG. 4A, the graph 410 includes various plots that correspond to an in-use example that implemented a sketch algorithm width of 100,000. In contrast, graph 420 in FIG. 4B includes various plots that correspond to an in-use example that implemented a sketch algorithm width of 10,000. Furthermore, graph 430 in FIG. 4C includes various plots that correspond to an in-use example that implemented a sketch algorithm width of 1,000,000.

While graph 430 in FIG. 4C illustrates the best performance in terms of count accuracy as seen by the dashed lines, it also has the highest memory usage to do so. In comparison, graph 420 in FIG. 4B illustrates the least amount of memory usage as seen by the solid line along the x-axis, but it also has the lowest relative accuracy. It follows that count accuracy and memory usage may be weighed to determine a desired level of performance, e.g., depending on the types of requests being evaluated. For example, graph 410 of FIG. 4A shows an implementation that achieves relatively low memory usage, while also achieving a relatively high accuracy.

Figure 5:
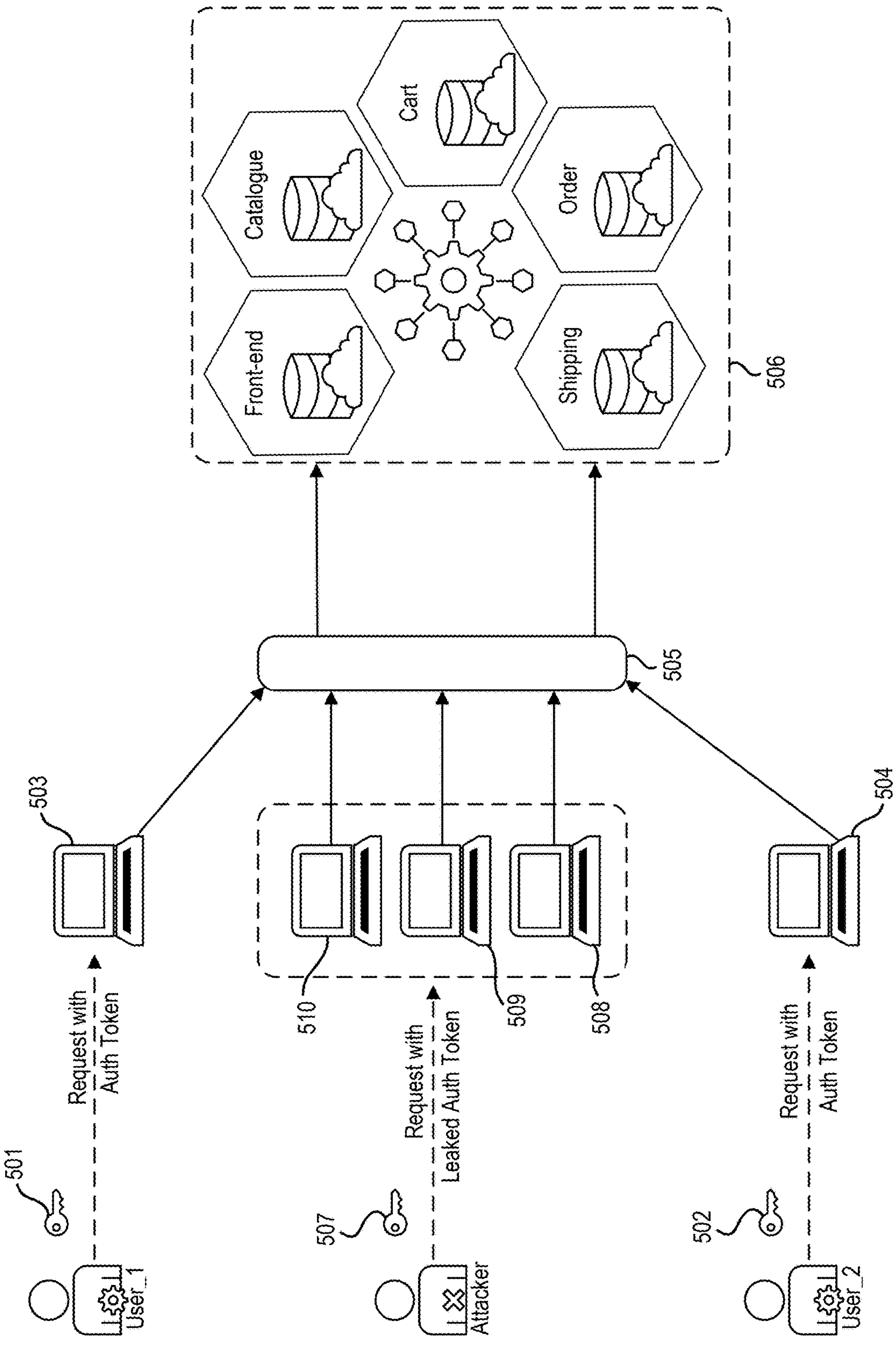
FIG. 5 is a representational view of how requests received from different sources are evaluated for authenticity, in accordance with an in-use example.

Looking now to FIG. 5, an in-use example illustrating how requests received from several different sources are evaluated for authenticity, such that legitimate requests are permitted while malicious requests are rejected. As shown, User 1 and User 2 each possess a legitimate authentication token 501, 502, respectively. Thus, as User 1 and User 2 submit requests (e.g., service requests, application requests, etc.), the requests are issued from devices 503, 504. These devices 503, 504 are each correlated with a respective one of User 1 and User 2. Thus, as User 1 issues an application request from device 503 using authentication token 501, the central node 505 is able to use the authentication token 501 and other metadata (e.g., Layer 7 metadata) extracted from the request, to verify that the application request satisfies security policies and can therefore be labeled as legitimate or not malicious. Legitimate requests are thereby allowed to proceed to a target application 506 for implementation. This may be done over a network, a local connection, or other channels depending on the implementation. Similarly, requests received from device 504 accompanied with authentication token 502 satisfy any policies implemented at the central node 505, and are allowed to proceed to application 506.

In contrast, the Attacker only has access to a leaked authentication token 507 which is used to submit requests from a number of different devices 508, 509, 510. Thus, as the Attacker attempts to submit malicious requests to the application 506, the same leaked authentication token 507 is received at the central node 505 from a number of different devices 508, 509, 510. Thus, by evaluating metadata (e.g., Layer 7 metadata) associated with each received request, the central node 505 is able to identify situations like this, where a single authentication token 507 is received from multiple different devices having different IP addresses. As noted herein, evaluating metadata thereby allows for malicious requests to easily be identified and rejected, while legitimate requests are able to pass through to the target location. Moreover, by evaluating the diversity of network traffic, the metadata in each request may be processed using a width that is dynamically updated to reflect the anticipated type of request.

Approaches herein are thereby able to achieve fast, policy-based prevention of malicious attacks, particularly Layer 7 based attacks, which have conventionally been unachievable. Approaches herein are also able to implement infrastructure level policies without implementing any application changes, allowing for the approaches to be generalized into any desired cluster. Furthermore, approaches are resource efficient by dynamically adjusting a tunable sketch algorithm to achieve low memory usage in parallel with quicker policy evaluation, e.g., as described herein. The ability to utilize Layer 7 metadata allows for the approaches herein to access and use information associated with interactions between services. This allows for the service request interactions to be summarized while also avoiding any underestimation during the aggregation of the interactions over a time interval. Again, this results in a faster dynamic policy evaluation which also consumes less memory with increasing number of interactions. Further still, approaches herein are cost effective by avoiding the use of large scale data for training anomaly detection models to identify anomalous behavior in microservice interactions, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:

in response to intercepting an application request:

causing a first copy of the application request to be forwarded to a policy agent, causing a second copy of the application request to be forwarded to a sketch algorithm, wherein the first copy and second copy of the application request are forwarded to the policy agent and the sketch algorithm simultaneously; and causing the sketch algorithm to extract metadata from the second copy of the application request includes:

accessing Layer 7 metadata in the second copy of the application request; and applying a width while summarizing the streaming traffic of the Layer 7 and wherein the width is determined while training the sketch algorithm, by:

causing the policy agent to forward network traffic to the sketch algorithm; and in response to detecting diverse active network traffic, causing the sketch algorithm to dynamically increase the width;

in response to detecting lean active network traffic, causing the sketch algorithm to dynamically decrease the width;

causing the policy agent to apply a security policy to the first copy of the application request and the metadata extracted by the sketch algorithm; and dispositioning the application request based at least in part on whether the first copy of the application request and/or the metadata extracted by the sketch algorithm satisfy the security policy, wherein the application request is intercepted by a proxy.

2. The CIM of claim 1, wherein the width is determined while training the sketch algorithm, by:

causing the policy agent to forward all network traffic to the sketch algorithm;

causing the sketch algorithm to observe the network traffic for a predetermined amount of time; and identifying a width that most effectively summarizes the network traffic.

3. The CIM of claim 1, wherein the width is dynamically updated over time, by:

observing active network traffic for a predetermined amount of time; in response to detecting diverse active network traffic, increasing the width; and in response to detecting lean active network traffic, decreasing the width.

4. The CIM of claim 1, wherein the Layer 7 metadata is selected from the group consisting of: service names, authentication tokens, Uniform Resource Locator (URL) paths, session tokens, cookies, and HTTP response codes.

5. The CIM of claim 1, wherein the dispositioning of the application request, includes:

in response to determining the first copy of the application request and/or the metadata extracted by the sketch algorithm satisfy the security policy, causing the application request to be forwarded to a target application for implementation.

6. The CIM of claim 5, wherein the dispositioning of the application request, includes:

in response to determining the first copy of the application request and/or the metadata extracted by the sketch algorithm do not satisfy the security policy, causing the application request to be rejected.

7. A computer program product (CPP), comprising:

a set of one or more computer-readable storage media; and program instructions, collectively stored in the set of one or more storage media, for causing a processor set to perform the following computer operations:

in response to intercepting an application request:

cause a first copy of the application request to be forwarded to a policy agent, and cause a second copy of the application request to be forwarded to a sketch algorithm cause the sketch algorithm to:

extract metadata from the second copy of the application request includes:

accessing Layer 7 metadata in the second copy of the application request;

and applying a width while summarizing the Streaming traffic of the Layer 7; and store the metadata extracted by the sketch algorithm in a designated portion of memory allocated to the sketch algorithm, the designated portion of memory having a width determined while training the sketch algorithm;

cause the policy agent to apply a security policy to the first copy of the application request and the metadata extracted by the sketch algorithm; and disposition the application request based at least in part on whether the first copy of the application request and/or the metadata extracted by the sketch algorithm satisfy the security policy wherein the width is dynamically updated over time, by:

observing active network traffic for a predetermined amount of time; in response to detecting diverse active network traffic, increasing the width of the designated portion of memory allocated to the sketch algorithm; and in response to detecting lean active network traffic, decreasing the width of the designated portion of memory allocated to the sketch algorithm.

8. The CPP of claim 7, wherein the first and second copies of the application request are forwarded to the policy agent and the sketch algorithm simultaneously.

9. The CPP of claim 7, wherein the application request is intercepted by a proxy.

10. The CPP of claim 7, wherein the width is determined while training the sketch algorithm, by:

causing the policy agent to forward all network traffic to the sketch algorithm;

causing the sketch algorithm to observe the network traffic for a predetermined amount of time;

determining an amount of the memory that most effectively summarizes the network traffic for the predetermined amount of time; and presetting the width as the determined amount of the memory.

11. The CPP of claim 7, wherein the Layer 7 metadata is selected from the group consisting of: service names, authentication tokens, Uniform Resource Locator (URL) paths, session tokens, cookies, and HTTP response codes.

12. The CPP of claim 7, wherein the dispositioning of the application request, includes:

in response to determining the first copy of the application request and/or the metadata extracted by the sketch algorithm satisfy the security policy, causing the application request to be forwarded to a target application for implementation.

13. The CPP of claim 12, wherein the dispositioning of the application request, includes:

in response to determining the first copy of the application request and/or the metadata extracted by the sketch algorithm do not satisfy the security policy, causing the application request to be rejected.

14. A computer system (CS), comprising:

a processor set;

a set of one or more computer-readable storage media;

program instructions, collectively stored in the set of one or more storage media, for causing the processor set to perform the following computer operations:

in response to intercepting an application request:

cause a first copy of the application request to be forwarded to a policy agent, and cause a second copy of the application request to be forwarded to a sketch algorithm cause the sketch algorithm to:

extract metadata from the second copy of the application request includes:

accessing Layer 7 metadata in the second copy of the application request;

and applying the width while summarizing the Streaming traffic of the Layer 7; and store the metadata extracted by the sketch algorithm in a designated portion of memory allocated to the sketch algorithm, the designated portion of memory having a width determined while training the sketch algorithm;

cause the policy agent to apply a security policy to the first copy of the application request and the metadata extracted by the sketch algorithm; and disposition the application request based at least in part on whether the first copy of the application request and/or the metadata extracted by the sketch algorithm satisfy the security policy wherein the width is dynamically updated over time, by:

observing active network traffic for a predetermined amount of time; in response to detecting diverse active network traffic, increasing the width of the designated portion of memory allocated to the sketch algorithm; and in response to detecting lean active network traffic, decreasing the width of the designated portion of memory allocated to the sketch algorithm.

* * * * *